US006976358B2

(12) United States Patent
Kim

(10) Patent No.: US 6,976,358 B2
(45) Date of Patent: Dec. 20, 2005

(54) CIRCUIT FOR CONTROLLING DISCHARGE AMOUNT OF HYDRAULIC PUMP

(75) Inventor: Jin Wook Kim, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 66 days.

(21) Appl. No.: 10/716,036

(22) Filed: Nov. 18, 2003

(65) Prior Publication Data

US 2004/0258537 A1 Dec. 23, 2004

(30) Foreign Application Priority Data

Jun. 19, 2003 (KR) ...................... 10-2003-0039742

(51) Int. Cl.[7] ................................................ F16D 31/02
(52) U.S. Cl. .......................................... 60/452; 60/450
(58) Field of Search .......................... 60/445, 450, 452, 60/468

(56) References Cited

U.S. PATENT DOCUMENTS 4,420,937 A * 12/1983 Naruse et al. ................ 60/452
5,758,499 A * 6/1998 Sugiyama et al. ............ 60/452
5,791,142 A * 8/1998 Layne et al. .................. 60/450
5,806,312 A * 9/1998 Kauss et al. .................. 60/452
5,907,951 A * 6/1999 Toyooka et al. .............. 60/445
5,941,155 A * 8/1999 Arai et al. ..................... 60/468

FOREIGN PATENT DOCUMENTS

JP 5943202 3/1984
JP 7317706 12/1995

OTHER PUBLICATIONS

English Abstract of JP 5943202 Dated Mar. 10, 1984.
English Abstract of JP 7317706 Dated Dec. 8, 1995.

* cited by examiner

*Primary Examiner*—Edward K. Look
*Assistant Examiner*—Michael Leslie
(74) *Attorney, Agent, or Firm*—Ladas and Parry LLP

(57) ABSTRACT

A circuit for controlling a discharge amount of a hydraulic pump to an actuator irrespective of a load pressure of the actuator even when an engine operates at a low speed has a variable displacement hydraulic pump connected with the engine; an actuator connected with the hydraulic pump; a center-bypass directional switching valve in a flow path between the hydraulic pump and the actuator for controlling start, stop and directional switching of the actuator during a switching operation; a pilot signal generating means in a down stream side of the center bypass for controlling the discharge amount of the hydraulic pump; and a discharge amount adjusting valve in a supply path of the actuator of the directional switching valve for controlling a discharge amount of hydraulic fluid to the actuator.

10 Claims, 7 Drawing Sheets

PRIOR ART

PRIOR ART

CIRCUIT FOR CONTROLLING DISCHARGE AMOUNT OF HYDRAULIC PUMP

BACKGROUND OF THE INVENTION

1. Field of the Invention

The present invention relates to a circuit for controlling a discharge amount of a hydraulic pump which is capable of obtaining and supplying a constant flow amount of hydraulic fluid in a hydraulic pump supplied to an actuator such as a hydraulic cylinder which is adapted to drive a work apparatus for a construction heavy equipment, irrespective of a load pressure of a hydraulic cylinder, and in particular to a circuit for controlling a discharge amount of a hydraulic pump which is capable of constantly supplying a discharge amount of a hydraulic pump to a hydraulic cylinder irrespective of a load pressure of a hydraulic cylinder even when an engine operates at a low speed.

Among the terminologies used herein, the terminology "Negative system" represents a method for decreasing a discharge amount of a variable displacement hydraulic pump in the case that pilot pressure discharged from an upper stream of a pilot signal generation unit installed in a down stream of a center bypass path is high and increasing a discharge amount of a hydraulic pump in the case that the pilot pressure is low.

In addition, the terminology "Positive system" represents a method for increasing a discharge amount of a variable displacement hydraulic pump in the case that pilot pressure applied to a directional switching valve adapted to control hydraulic fluid supplied to a hydraulic cylinder is high and decreasing a discharge amount of a hydraulic pump in the case that pilot pressure is low.

2. Description of the Background Art

FIG. 1 is a schematic view illustrating a discharge amount control circuit for a hydraulic pump according to a conventional art, and FIG. 2 is a graph illustrating a discharge amount relation of a hydraulic pump based on a spool stroke in a conventional art.

As shown in FIG. 1, a variable displacement hydraulic circuit for controlling a discharge amount of a hydraulic pump according to a conventional art includes a variable displacement hydraulic pump 20 which is connected with an engine and is driven thereby, a hydraulic cylinder 24 which is connected to the hydraulic pump 20 through a supply flow path 22 and has a load W, a center bypass type directional switching valve 26 which is installed in a flow path between the hydraulic pump 20 and the hydraulic cylinder 24 and is adapted to control a start, stop and directional switch of the hydraulic cylinder 24 during a switching operation, a discharge amount adjusting valve 32 which is installed in a flow path 30 communicating with the center bypass path 28 of the directional switching valve 26 and controls a center bypass discharge amount Q2, and a pilot signal generation unit 36 which is formed of an orifice and low pressure relief valve (not shown) and is installed in a down stream of the discharge amount adjusting valve 32 and controls a discharge amount Q1 of the hydraulic pump 20.

In the drawings, reference numeral 34 represents a valve spring for adjusting an opening degree of the discharge amount adjusting valve 32. In addition, 38 represents a main relief valve for preventing the pressure in the hydraulic circuit from exceeding a set level, and 40 represents a hydraulic tank.

The discharge amount adjusting valve 32 is opened and closed by a difference pressure ΔP between an upper stream pressure (referred to a discharge pressure of the hydraulic pump 20) of the center bypass path 28 and a down stream pressure (referred to an operation pressure of the hydraulic cylinder 24) and an elastic force of the valve spring 34. The discharge amount adjusting valve 32 is set and controlled based on an opening area of the center bypass path 28.

Namely, in the case that the opening area of the opening and closing portion of the center bypass path 28 is high (when the difference pressure ΔP is small), the discharge amount adjusting valve 32 is fully largely opened by the valve spring 34. In the case that the opening area is small (the difference pressure ΔP is high), the opening area is decreased, while resisting to an elastic force of the valve spring 34.

Therefore, the bypass discharge amount Q2 in the center bypass path 28 is set to a constant discharge amount of hydraulic fluid corresponding to the opening area of the opening and closing portion of the center bypass path 28 irrespective of the pressure of the supply flow path 22.

In addition, in the case that the pilot pressure discharged from the upper stream of the pilot signal generation unit 36 is high, the pilot signal generation unit 36 is controlled in order for the discharge amount Q1 of the variable displacement hydraulic pump 20 to be decreased, and on the contrary in the case that the pilot pressure is low, the pilot signal generation unit 36 is controlled in order for the discharge amount Q1 of the hydraulic pump 20 to be increased (Referred to Negative system).

At this time, the pilot pressure which controls the discharge amount of the variable displacement hydraulic pump 20 is set in order for the discharge amount of the hydraulic pump 20 to be minimum during a neutral state of the spool of the directional switching valve 26.

As shown in FIG. 2, the discharge amount Q3 supplied to the hydraulic cylinder 24=[Discharge amount Q1 of the variable displacement hydraulic pump 20]−[Bypass discharge amount Q2 of the center bypass path 28]. Namely, the discharge amount Q3 of hydraulic fluid supplied to the hydraulic cylinder 24 is controlled to have a constant discharge amount corresponding to the opening area of the opening and closing portion of the bypass path 28 based on the position of the spool stroke of the directional switching valve 26 and is set irrespective of the load pressure of the hydraulic cylinder 24.

In the discharge amount Q1 of hydraulic fluid from the variable displacement hydraulic pump 20, as only hydraulic fluid having the discharge amount Q3 except for the bypass discharge amount Q2 of hydraulic fluid discharged to the hydraulic tank 40 through the center bypass path 28 is supplied to the hydraulic cylinder 24, in the high speed mode of the engine, a constant discharge amount Q2 of hydraulic fluid discharged from the hydraulic pump 20 is bypassed to the hydraulic tank 40, and the hydraulic fluid having the remaining discharge amount Q3 is supplied to the hydraulic cylinder 24 by a desired amount.

However, in the conventional circuit for controlling a discharge amount of the hydraulic pump, in the low speed mode of the engine, since it is impossible to fully supply the remaining discharge amount Q3 of hydraulic fluid to the hydraulic cylinder 24 by a desired amount after a constant discharge amount Q2 of hydraulic fluid discharged from the hydraulic pump 20 is bypassed to the hydraulic tank 40, a discharge amount lacking phenomenon occurs. Therefore, a cavitation occurs. In addition, since the spool strokes of the switching valve are switched more in order to obtain a discharge amount by the lacking discharge amount, an inching control interval is decreased, and an operation ability of equipment is decreased.

SUMMARY OF THE INVENTION

Accordingly, it is an object of the present invention to provide a circuit for controlling a discharge amount of a hydraulic pump, which is capable of constantly supplying a discharge amount of a hydraulic pump to a hydraulic cylinder irrespective of a load pressure of a hydraulic cylinder at a low speed rotation of an engine.

It is another object of the present invention to provide a circuit for controlling a discharge amount of a hydraulic pump, which is capable of preventing a cavitation due to a lack of discharge amount and enhancing an operation ability of equipment because an inching control interval is decreased.

It is further another object of the present invention to provide a circuit for controlling a discharge amount of a hydraulic pump, which is capable of supplying a constant discharge amount of hydraulic fluid to a hydraulic cylinder irrespective of a load pressure because it is possible to obtain the same effect as a load sensing in a negative or positive system.

To achieve the above objects, in a circuit for controlling a discharge amount of a hydraulic pump including a variable displacement hydraulic pump connected with an engine, an actuator connected with the hydraulic pump, a center bypass type directional switching valve installed in a flow path between the hydraulic pump and the actuator for controlling a start, stop and directional switching of the actuator during a switching operation, and a pilot signal generation unit installed in a down stream side of a center bypass path of the directional switching valve for controlling a discharge amount of the hydraulic pump, there is provided a circuit for controlling a discharge amount of a hydraulic pump which comprises a discharge amount adjusting valve which is installed in a supply path of the actuator of the center bypass type directional switching valve for controlling a discharge amount of hydraulic fluid supplied to the actuator and has an opening portion opened and closed based on a difference pressure between an upper stream side pressure and a down stream side pressure of the supply path of the actuator and an elastic force of a valve spring.

The discharge amount adjusting valve includes a variable orifice which is capable of generating a difference pressure between an upper stream side pressure and a down stream side pressure of the supply path of the actuator and has an opening portion controlled by an external signal.

The discharge amount adjusting valve is installed outside the spool of the center bypass type directional switching valve.

The pilot signal generation unit is a pressure generating apparatus formed of an orifice and a low pressure relief valve for discharging pilot pressure in an upper stream side of the pilot signal generation unit and controlling the discharge amount of the variable displacement hydraulic pump based on a negative system.

The pilot signal generation unit includes a pilot pump which discharges pilot pressure, a remote control valve adapted to control pilot pressure applied to the center bypass type switching valve, and a shuttle valve which has an inlet portion connected with the center bypass type switching valve and an outlet portion connected with the hydraulic pump, wherein the variable displacement hydraulic pump is controlled based on a positive discharge amount control method, so that the discharge amount of the variable displacement hydraulic pump is controlled in proportion to pilot pressure applied to the center bypass type switching valve.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
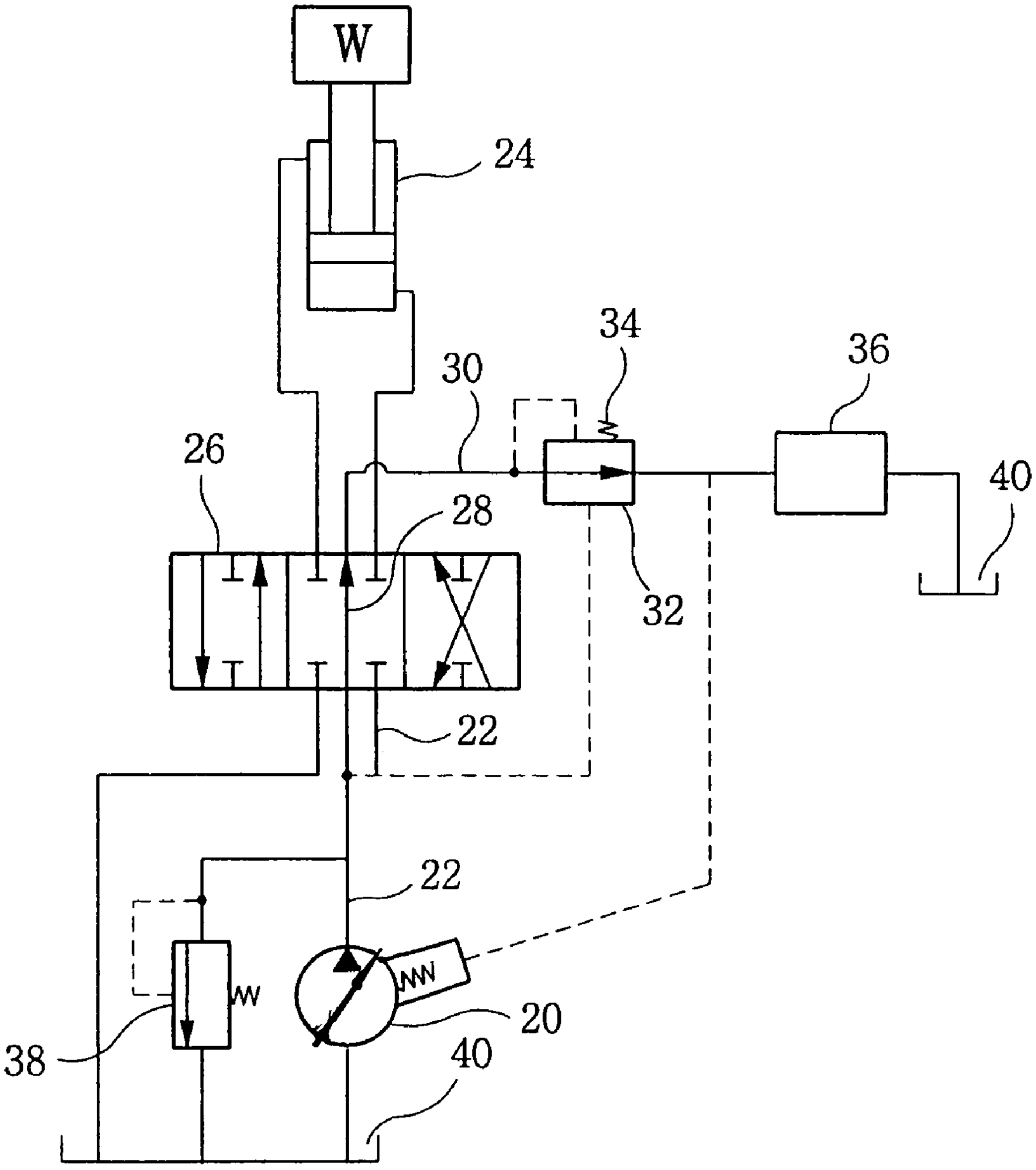
FIG. 1 is a schematic view illustrating a discharge amount control circuit for a hydraulic pump according to a conventional art.
Figure 2:
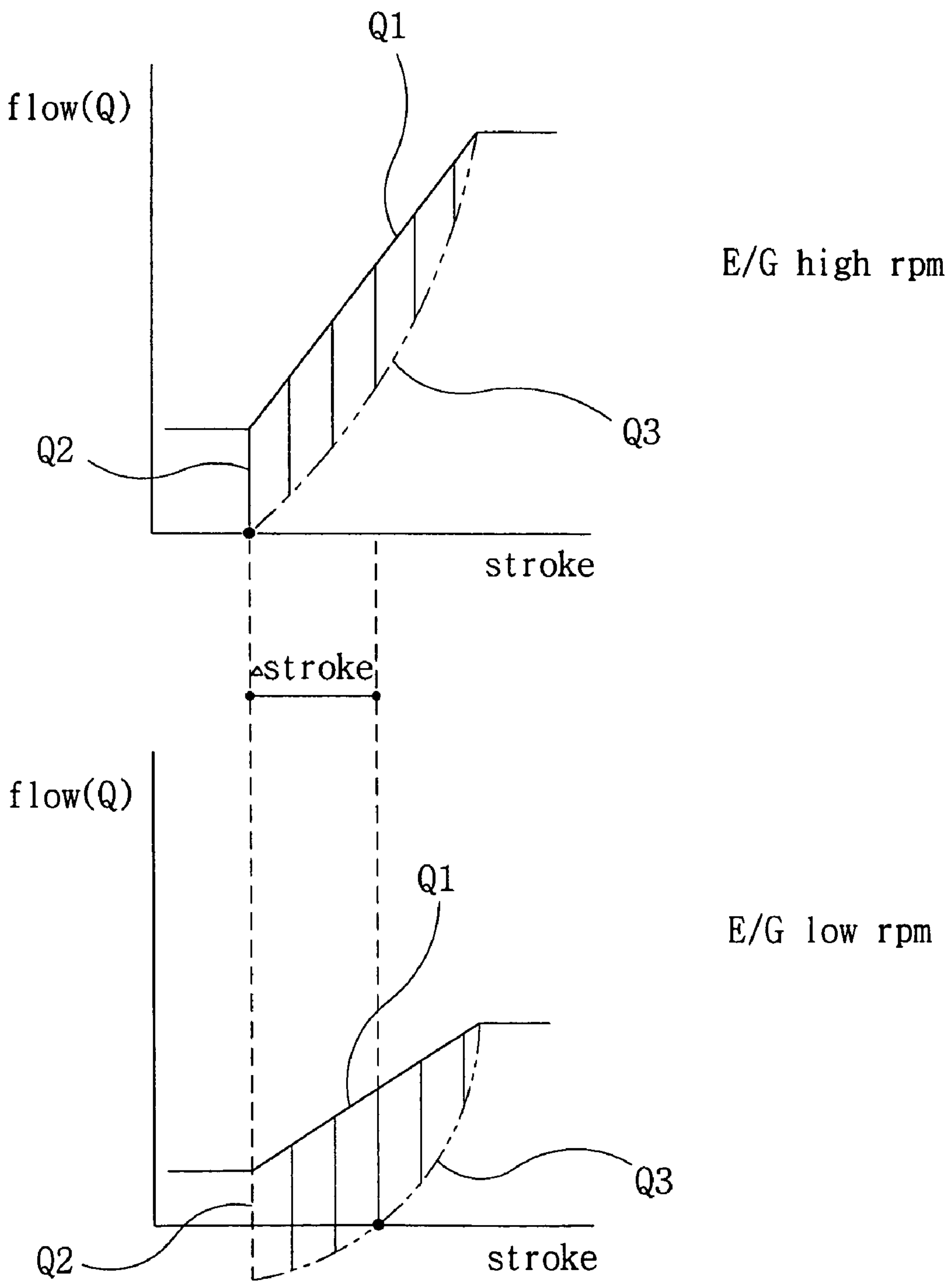
FIG. 2 is a graph of a relation of a discharge amount of a hydraulic pump based on a spool stroke in a conventional art.
Figure 3:
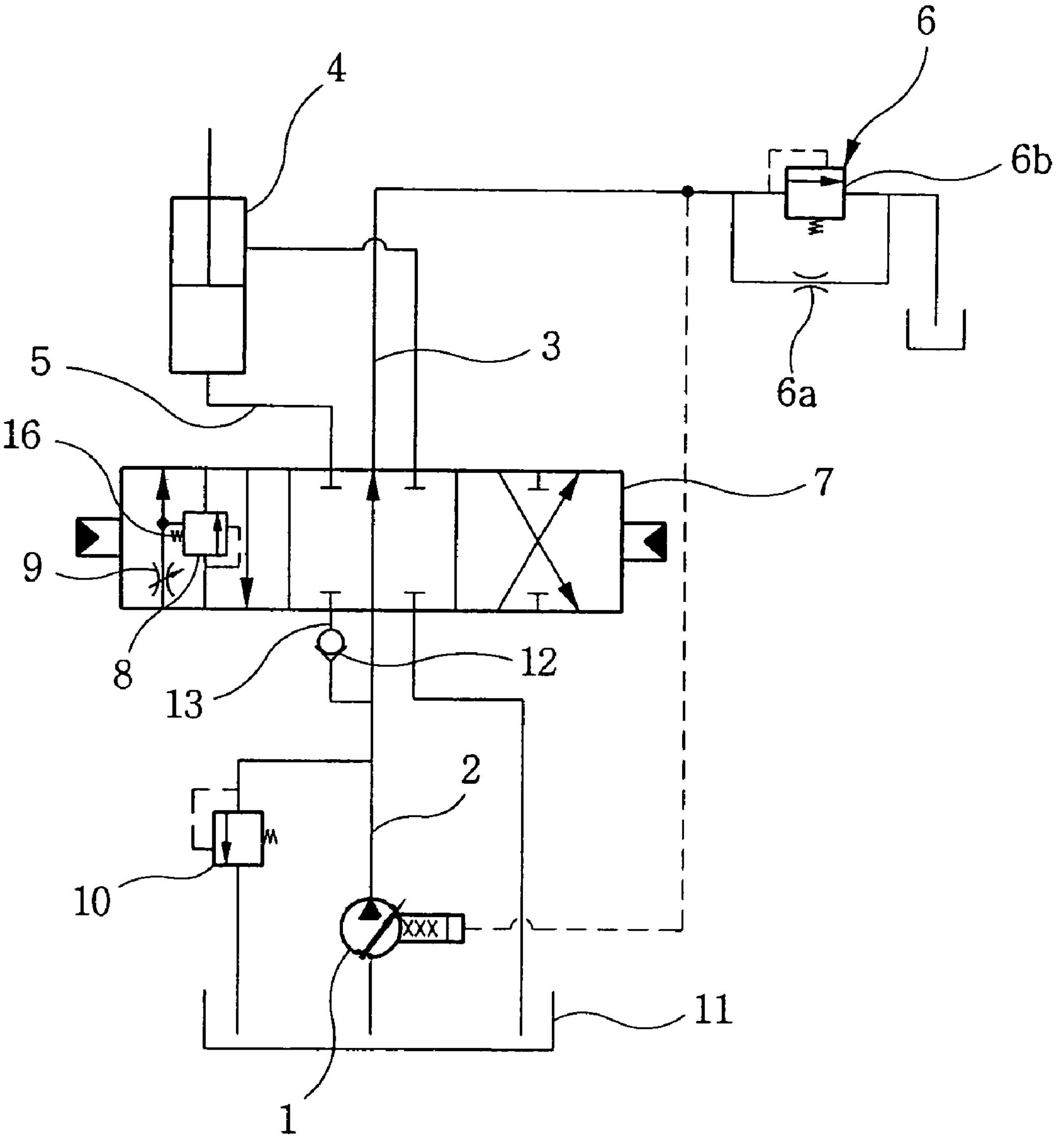
FIG. 3 is a schematic view illustrating a circuit for controlling a discharge amount of a hydraulic pump according to an embodiment of the present invention.
Figure 6:
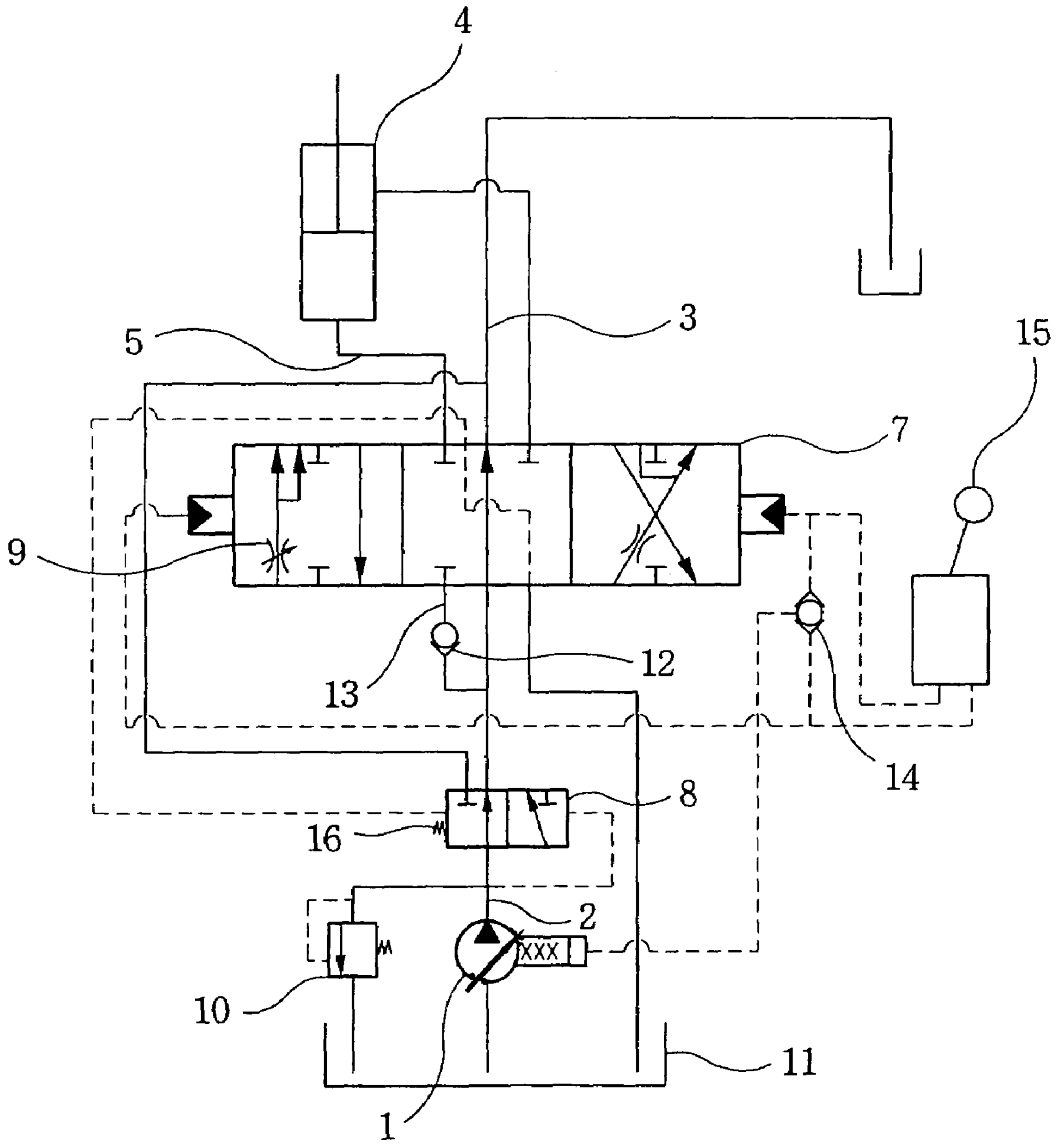
FIG. 6 is a schematic view illustrating a circuit for controlling a discharge amount of a hydraulic pump according to further another embodiment of the present invention.

As shown in FIGS. 3 and 6, there are provided a variable displacement hydraulic pump 1 connected with an engine, an actuator 4 (referred to a hydraulic cylinder, etc.) which is connected with the hydraulic pump 11 through a supply flow path 2, a center bypass type directional switching valve 7 which is installed in a flow path between the hydraulic pump 1 and the actuator 4 and is adapted to control a start, stop and direction switching operation of the actuator 4 during a switching operation, and a pilot signal generation unit 6 which is installed in a down stream of the center bypass path 3 of the directional switching valve 7 and is adapted to control a discharge amount Q1 of the hydraulic pump 1. The above construction is actually the same as the construction of FIG. 1. Therefore, the detailed descriptions of the construction and operation will be omitted.

As shown in FIG. 3, a circuit for controlling a discharge amount of a hydraulic pump according to an embodiment of the present invention includes a discharge amount adjusting valve 8 which is installed in an actuator supply path 5 of the center bypass type directional switching valve 7 for controlling a discharge amount Q3 of hydraulic fluid supplied to the actuator 4. The discharge amount adjusting valve 8 has an opening and closing portion which is opened and closed by a difference pressure ΔP between an upper stream pressure of the actuator supply path 5 and a down stream pressure of the same and an elastic force of a valve spring 16.

The discharge amount adjusting valve 8 may be installed inside (shown in FIGS. 3 and 5) or outside (shown in FIGS. 4 and 6) the spool of the center bypass type directional switching valve 7. The discharge amount adjusting valve 8 includes a variable orifice 9 which is adapted to generate a certain difference pressure ΔP between an upper stream pressure and a down stream pressure of the actuator supply path 5 and is set in order for the opening portion to be controlled by an external signal.

In the case that the opening area of the opening and closing portion of the actuator supply path 13 is large, the discharge amount adjusting valve 8 is fully opened by the valve spring 16. On the contrary, in the case that the opening area of the supply path 13 is small, the opening area is decreased, while resisting to an elastic force of the valve spring 16.

Namely, the discharge amount Q3 which is discharged from the variable displacement hydraulic pump 1 and passes through the actuator supply path 5 and is supplied to the actuator 4 is set to correspond with the opening area of the opening and closing portion of the actuator supply path 13 irrespective of the pressure of the supply path 2.

The pilot signal generation unit 6 adapted to control the discharge amount Q1 of the variable displacement hydraulic pump 1 is a pressure generating apparatus formed of an orifice 6*a* and a low pressure relief valve 6*b*. The pilot signal generation unit 6 discharges pilot pressure to an upper stream of the pilot signal generation unit 6 and controls the variable displacement hydraulic pump 1.

At this time, in the case that the pilot pressure discharged in the upper stream of the pilot signal generation unit 6 is high, it is controlled that the discharge amount Q1 of the variable displacement hydraulic pump 1 is decreased. On the contrary, in the case that the pilot pressure is low, it is controlled that the discharge amount Q1 of the hydraulic pump 1 is increased (negative system). The discharge amount Q1 of the variable displacement hydraulic pump 1 is set to be minimized during the neutral state of the spool of the center bypass type directional switching valve 7.

In the drawing, reference numeral 10 represents a main relief valve, 11 represents a hydraulic tank, 12 represents a check valve and 14 represents a shuttle valve.

The operation of the circuit for controlling a discharge amount of the hydraulic pump according to the present invention will be described with reference to the accompanying drawings.

Figure 7:
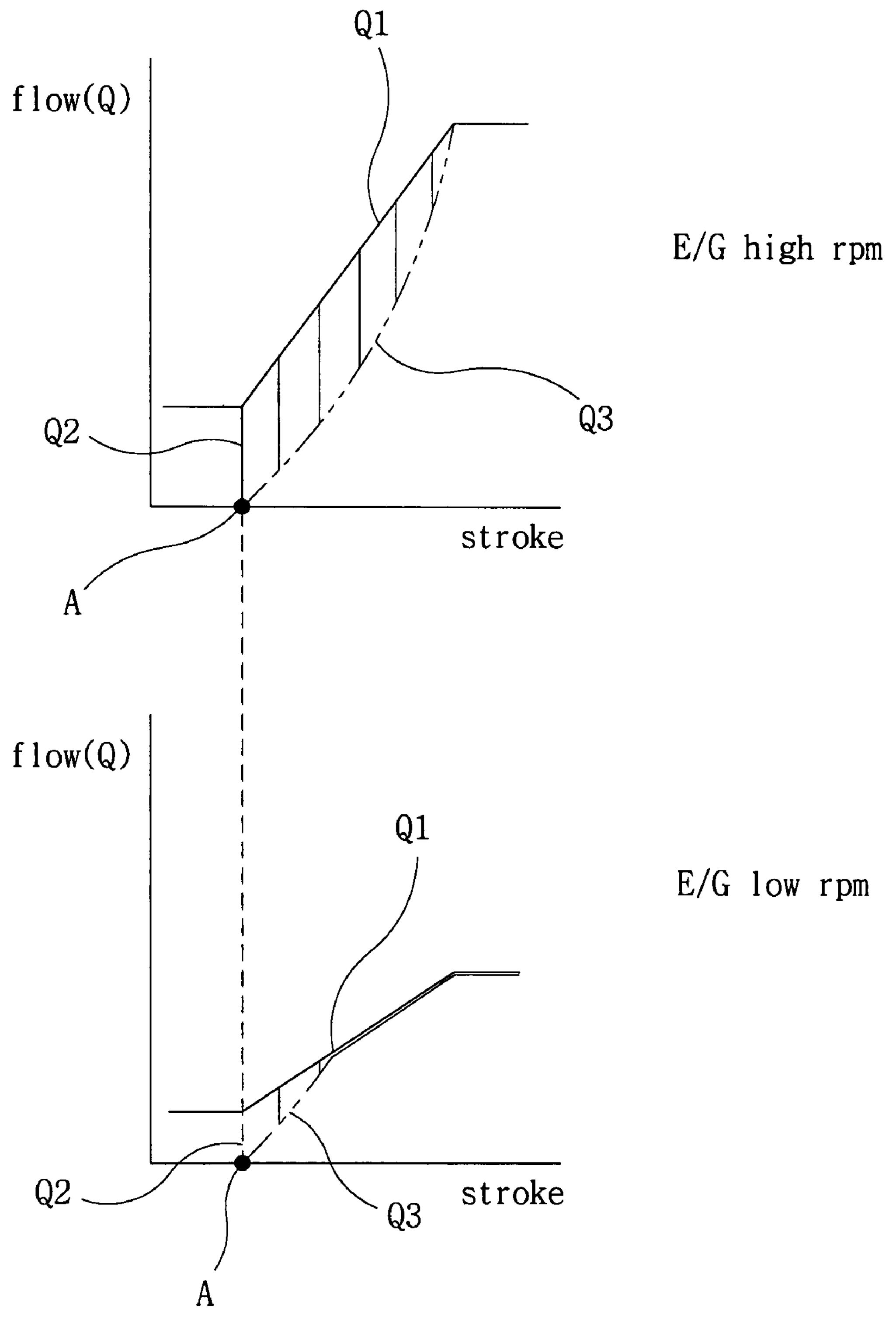
FIG. 7 is a graph of a relation of a discharge amount based on a spool stroke according to the present invention.

As shown in FIGS. 3 and 7, when the spool of the center bypass type directional switching valve 7 is switched in the right direction shown in FIG. 3, the discharge amount Q1 of hydraulic fluid discharged from the variable displacement hydraulic pump 1 is supplied to the actuator 4 through the supply path 2 and the actuator supply path 13. At the same time, a part of the discharge amount Q1 is bypassed to the hydraulic tank (bypass tank Q2) through the discharge amount adjusting valve 8, the center bypass path 3 and the pilot signal generation unit 6.

At this time, the discharge amount Q1 of the variable displacement hydraulic pump 1 controlled by pilot pressure discharged from the upper stream side of the pilot signal generation unit 6 is controlled to have a certain size corresponding to the opening area of the opening and closing portion of the actuator supply path 13 based on the position of the spool stroke of the discharge amount adjusting valve 8. Namely, the discharge amount Q3 of hydraulic fluid supplied to the actuator 4 is determined to have a constant discharge amount corresponding to the position of the spool stroke irrespective of the load pressure.

FIG. 7 illustrates a relation between the discharge amount Q1 from the variable displacement hydraulic pump 1, the discharge amount Q2 bypassed through the center bypass path 3, and the discharge amount Q3 of hydraulic fluid supplied to the actuator 4.

Namely, the discharge amount Q3 of the actuator 4=[discharge amount Q1 of the hydraulic pump 1−bypass discharge amount Q2].

The discharge amount Q3 of hydraulic fluid supplied to the actuator 4 is controlled to have a constant discharge amount corresponding to the position of the spool stroke of the center bypass type directional switching valve 7, namely, the opening area of the variable orifice 9 installed in the actuator supply path 13. The discharge amount Q3 is set irrespective of the load pressure of the actuator 4.

The total amount of the discharge amount Q1 discharged from the variable displacement hydraulic pump 1 is discharged to the hydraulic tank through the center bypass path 3 and the pilot signal generation unit 6 during the neutral state of the center bypass type directional switching valve 7 (bypass discharge amount Q2).

At this time, since the opening area of the opening and closing portion of the center bypass path 3 is set in maximum, the discharge amount Q2 which is bypassed is maximized, and the discharge amount Q1 of hydraulic fluid discharged from the variable displacement hydraulic pump 1 is set in minimum.

Figure 4:
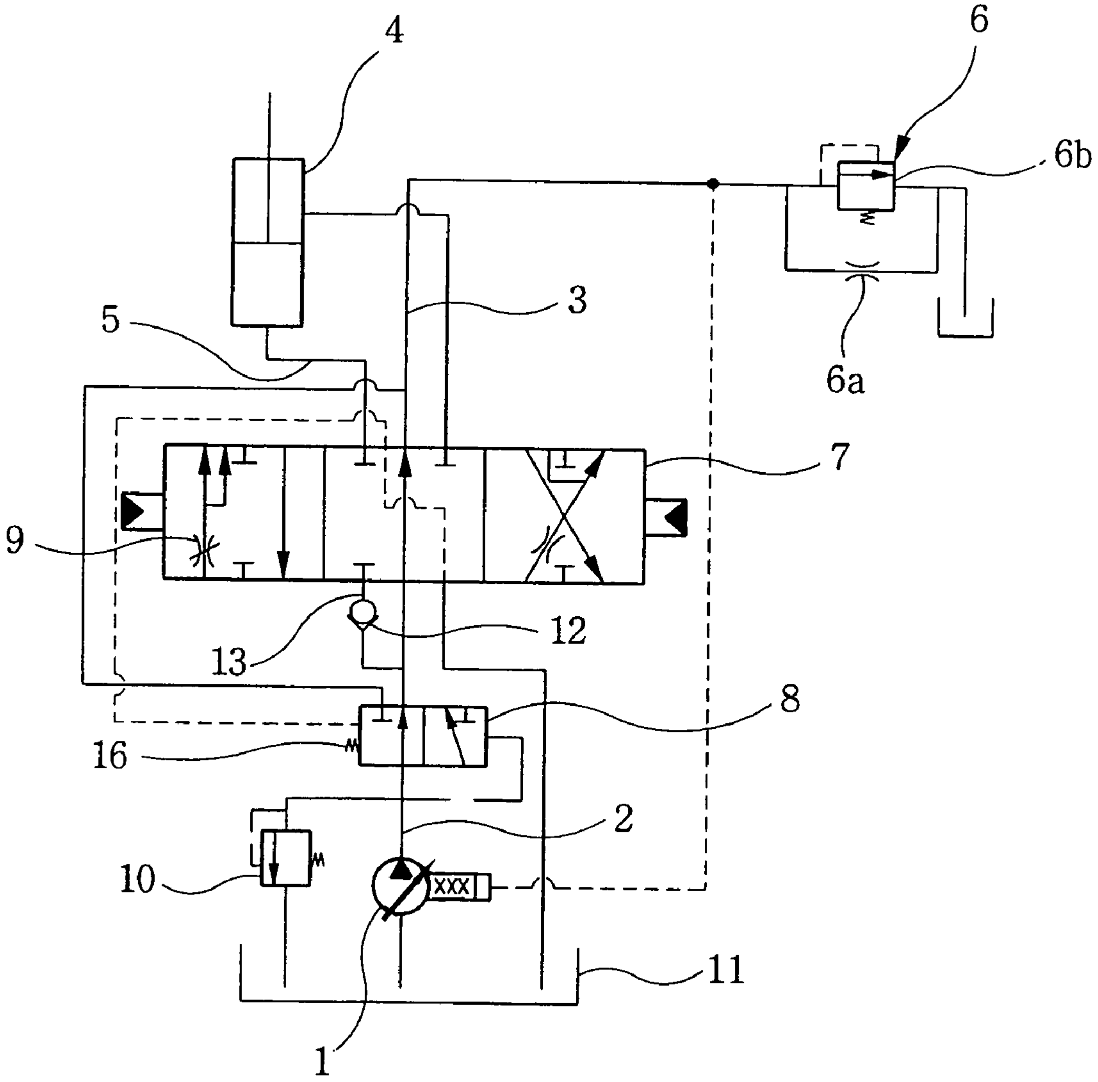
FIG. 4 is a schematic view illustrating a circuit for controlling a discharge amount of a hydraulic pump according to another embodiment of the present invention.

FIG. 4 is a view illustrating a circuit for controlling a discharge amount of a hydraulic pump according to another embodiment of the present invention.

As shown therein, the discharge amount adjusting valve 8 installed in the actuator supply path 5 for controlling the discharge amount Q3 of hydraulic fluid supplied from the variable displacement hydraulic pump 1 to the actuator 4 is installed in the upper stream side of the center bypass path 3 outside the spool of the center bypass type directional switching valve 7. Here, since the constructions of the actuator 4 connected with the hydraulic pump 1, the center bypass type directional switching valve 7 adapted to control the flow direction of hydraulic fluid supplied to the actuator 4, and the pilot signal generation unit 6 installed in the down stream side of the center bypass path 3 are the same as the construction of FIG. 3. Therefore, the detailed descriptions of the construction and operation are omitted. The same reference numerals are given with respect to the same constructions.

Figure 5:
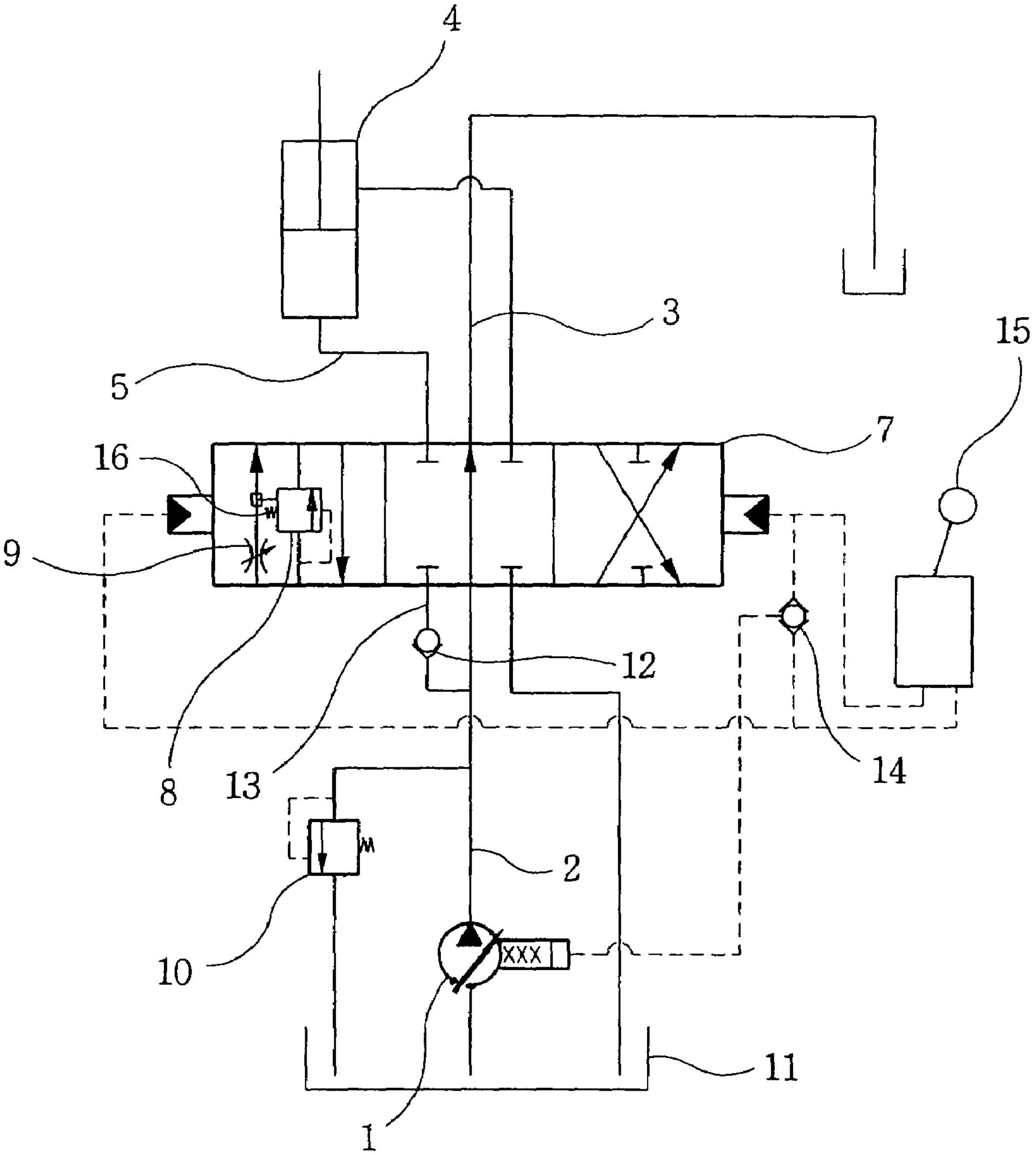
FIG. 5 is a schematic view illustrating a circuit for controlling a discharge amount of hydraulic pump according to further another embodiment of the present invention.

FIG. 5 is a view illustrating a circuit for controlling a discharge amount of a hydraulic pump according to another embodiment of the present invention.

As shown therein, there are provided a pilot pump (not shown) which discharges pilot pressure and operates as a pilot signal generation unit 6 adapted to control the discharge amount Q1 of the variable displacement hydraulic pump 1, a remote control valve (RCV) 15 for controlling a pilot signal supplied from the pilot pump to the center bypass type directional switching valve 7, and a shuttle valve 14 in which an inlet side is connected with the center bypass type switching valve 7, and an outlet side is connected with the variable displacement hydraulic pump 1.

Therefore, the pilot pressure supplied to the left and right sides of the center bypass type directional switching valve 7 is discharged through the shuttle valve 14 during the operation of the remote control valve 15, so that the discharge amount of the variable displacement hydraulic pump 1 is controlled (positive system) in proportion to the pilot pressure. Namely, in the case that the pilot pressure is high, the discharge amount of the hydraulic pump 1 is increased. In the case that the pilot pressure is low, it is controlled that the discharge amount of the hydraulic pump 1 is decreased.

Here, since the constructions of the actuator 4 connected with the variable displacement hydraulic pump 1, the center bypass type directional switching valve 7 adapted to control the flow direction of hydraulic fluid supplied to the actuator 4, and the discharge amount adjusting valve 8 adapted to control the discharge amount of hydraulic fluid supplied to the actuator 7 are the same as the constructions of FIG. 3. Therefore, the detailed descriptions of the constructions and operation will be omitted. The same reference numerals are given with respect to the same constructions.

FIG. 6 is a view illustrating a circuit for controlling a discharge amount of hydraulic pumps according to further another embodiment of the present invention.

As shown therein, the discharge amount adjusting valve 8 installed in the actuator supply path 5 for controlling the discharge amount Q3 of hydraulic fluid supplied from the variable displacement hydraulic pump 1 to the actuator 4 may be installed in an upper stream side of the center bypass path 3 outside the spool of the center bypass type directional switching valve 7.

At this time, since the constructions of the actuator 4 connected with the variable displacement hydraulic pump 1, the center bypass type directional switching valve 7 adapted to control the flow direction of hydraulic fluid supplied to the actuator 4, and the remote control valve 15 adapted to control the variable displacement hydraulic pump 1 (positive system) by discharging pilot pressure from the pilot pump for switching the center bypass type switching valve 7 and controlling the maximum discharge amount of the variable displacement hydraulic pump 1 are the same as the constructions of FIG. 5. Therefore, the detailed descriptions of the constructions and operation will be omitted. The same reference numerals are given with respect to the same constructions.

As shown in FIG. 7, in the circuit for controlling a discharge amount of the hydraulic pump according to the present invention, a constant discharge amount needed to the actuator 4 based on the opening area of the center bypass type directional switching valve 7 is implemented by a difference pressure ΔP between an operation pressure discharged from the variable displacement hydraulic pump 1 and an operation pressure supplied to the actuator 4. A discharged amount not needed in the actuator 4 is discharged to the hydraulic tank through the center bypass path 3. Therefore, it is possible to fully supply a discharge amount needed to the actuator 4 in the low speed mode of the engine.

Namely, since the stroke start point of the spool adapted to supply hydraulic fluid to the actuator 4 is not changed in both the high speed mode and the low speed move of the engine, it is possible to prevent a phenomenon that the inching control interval is decreased. In addition, since the discharge amount from the variable displacement hydraulic pump 1 is directly supplied to the actuator 4, it is possible to prevent a cavitation.

The circuit for controlling a hydraulic pump discharge amount according to the present invention has the following advantages.

It is possible to prevent a loss in a discharge amount since a certain metering is maintained irrespective of a load pressure of a hydraulic cylinder in such a manner that a discharge amount is adjusted based on a difference pressure between a hydraulic pump and a hydraulic cylinder.

Since a discharge amount of a hydraulic is constantly supplied to a hydraulic cylinder in the low speed mode of the engine, a cavitation is prevented. As an inching control interval is decreased, it is possible to prevent a decrease in an operation ability of equipment.

In addition, since it is possible to obtain the same effect as in the rod sensing in both the negative and positive systems, a constant discharge amount is supplied to the hydraulic cylinder irrespective of the load pressure for thereby accurately controlling the equipment.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A circuit for controlling a discharge amount of a hydraulic pump, comprising:

a variable displacement hydraulic pump for connection with an engine;

an actuator connected with the hydraulic pump;

a center bypass type directional switching valve installed in a flow path between the hydraulic pump and the actuator for controlling a start, stop and directional switching of the actuator during a switching operation;

a pilot signal generating means installed in a down stream side of a center bypass path of the directional switching valve for controlling a discharge amount of the hydraulic pump; and a discharge amount adjusting valve which is installed in a supply path of the actuator of the center bypass type directional switching valve for controlling a discharge amount of hydraulic fluid supplied to the actuator and has an opening portion opened and closed based on a difference pressure between an upper stream side pressure and a down stream side pressure of the supply path of the actuator and an elastic force of a valve spring.

2. The circuit of claim 1, wherein said discharge amount adjusting valve includes a variable orifice which is capable of generating a difference pressure between an upper stream side pressure and a down stream side pressure of the supply path of the actuator and has an opening portion controlled by an external signal.

3. The circuit of claim 1, wherein said discharge amount adjusting valve is installed in the interior of a spool of the center bypass type directional switching valve.

4. The circuit of claim 1, wherein said discharge amount adjusting valve is installed outside the spool of the center bypass type directional switching valve.

5. The circuit of claim 1, wherein said pilot signal generating means is a pressure generating apparatus formed of an orifice and a low pressure relief valve for discharging pilot pressure in an upper stream side of the pilot signal generating means and controlling the discharge amount of the variable displacement hydraulic pump based on a negative system.

6. The circuit of claim 1, wherein said pilot signal generating means includes:

a pilot pump that discharges pilot pressure;

a remote control valve adapted to control pilot pressure applied to the center bypass type switching valve; and a shuttle valve, which has an inlet portion connected with the center bypass type switching valve and an outlet portion connected with the hydraulic pump, wherein the variable displacement hydraulic pump is controlled based on a positive discharge amount control method, so that the discharge amount of the variable displacement hydraulic pump is controlled in proportion to pilot pressure applied to the center bypass type switching valve.

7. The circuit of claim 6, wherein said discharge amount adjusting valve installed in the supply path of the actuator is installed inside the spool of the center bypass type directional switching valve.

8. The circuit of claim 6, wherein said discharge amount adjusting valve installed in the supply path of the actuator is installed outside the spool of the center bypass type directional switching valve.

9. The circuit of claim 2, wherein said discharge amount adjusting valve is installed in the interior of a spool of the center bypass type directional switching valve.

10. The circuit of claim 2, wherein said discharge amount adjusting valve is installed outside the spool of the center bypass type directional switching valve.

* * * * *